United States Patent
Shreiner

(10) Patent No.: US 7,830,390 B2
(45) Date of Patent: Nov. 9, 2010

(54) COLOR COMPUTATION OF PIXELS USING A PLURALITY OF VERTEX OR FRAGMENT SHADER PROGRAMS

(75) Inventor: David Shreiner, Mountain View, CA (US)

(73) Assignee: Graphics Properties Holdings, Inc., Palo Alto, CA (US)

( * ) Notice: Subject to any disclaimer, the term of this patent is extended or adjusted under 35 U.S.C. 154(b) by 660 days.

(21) Appl. No.: 11/183,848

(22) Filed: Jul. 19, 2005

(65) Prior Publication Data

US 2007/0018990 A1  Jan. 25, 2007

(51) Int. Cl.
G06F 15/80 (2006.01)
G06F 15/16 (2006.01)

(52) U.S. Cl. ........................ 345/505; 345/502

(58) Field of Classification Search ............ 345/502, 345/505, 506
See application file for complete search history.

(56) References Cited

U.S. PATENT DOCUMENTS

| | | | | |
|---|---|---|---|---|
| 5,485,559 | A * | 1/1996 | Sakaibara et al. | 345/505 |
| 6,181,346 | B1 * | 1/2001 | Ono et al. | 345/582 |
| 6,266,072 | B1 * | 7/2001 | Koga et al. | 345/505 |
| 6,954,204 | B2 * | 10/2005 | Zatz et al. | 345/522 |
| 6,972,769 | B1 * | 12/2005 | Nebeker et al. | 345/552 |
| 7,154,500 | B2 * | 12/2006 | Heng et al. | 345/424 |
| 7,339,590 | B1 * | 3/2008 | Moskal et al. | 345/501 |
| 2005/0225554 | A1 * | 10/2005 | Bastos et al. | 345/506 |
| 2006/0055695 | A1 * | 3/2006 | Abdalla et al. | 345/426 |
| 2006/0152509 | A1 * | 7/2006 | Heirich | 345/426 |

* cited by examiner

*Primary Examiner*—Kee M Tung
*Assistant Examiner*—Jacinta Crawford
(74) *Attorney, Agent, or Firm*—Sterne, Kessler, Goldstein & Fox PLLC

(57) ABSTRACT

A plurality of vertex or fragment processors on a graphics processor perform computations. Each vertex or fragment processor is capable of executing a separate program to compute a specific result. A combiner manages the combination of the results from the respective processors, and produces a final transformed vertex or pixel value. The vertex or fragment processors and the combiner can be programmable to modify their operations. As such, the vertex or fragment processors can operate in a parallel or serial configuration, or both. The combiner manages and resolves the operations of the serial and/or parallel configurations. A synchronization barrier enables the combiner to perform data-dependency analysis to determine the timing and ordering of the respective processors' execution. A transformation module can include one or more programmable vertex processors that transforms three-dimensional geometric data into fragments. The fragment processors subsequently receive and compute a result for each fragment, which is combined using the combiner to produce the final pixel value.

34 Claims, 8 Drawing Sheets

COLOR COMPUTATION OF PIXELS USING A PLURALITY OF VERTEX OR FRAGMENT SHADER PROGRAMS

BACKGROUND OF THE INVENTION

1. Field of the Invention

The present invention relates generally to producing computer generated images, and more specifically, to computing pixel values for said images.

2. Related Art

Computer graphics processing algorithms can be categorized into two principal methods: ray tracing and rasterization. Almost all modern computer graphics cards implement the rasterization method. This method is characterized by a "graphics pipeline," that dictates how three-dimensional geometric data as well as two-dimensional pixel data are processed to ultimately be displayed in a frame buffer. For each geometric primitive, the corresponding geometric data enters a transformation stage and is transformed into fragments. Those fragments, and their corresponding pixel data, are rasterized to compute a final pixel color. This version of the pipeline is commonly called the "fixed-function pipeline."

Recent generations of graphics processors have diverged from the fixed-function pipeline model. In these implementations, the fixed order of functions performed by either the transformation or rasterization stages is replaced by a user-defined, computer program, commonly termed a shader. However, conventional "programmable pipelines" suffer from substantial limitations. For example, during the rasterization stage, a single shader for coloring a pixel must perform all color computations for said pixel. Therefore, if pixels share common color computations that are invariant between separate pixels and computed identically inside of the shader program, the current shader architecture forces those computations to be redundantly computed. A similar situation exists in the processing of vertices by the transformation stage of the graphics pipeline.

User modifications of shader programs impose another limitation on conventional programmable pipelines. For instance, if a pixel shader is programmed to perform multiple operations, these operations are combined within the code of a single pixel shader, so that all color computations are processed, as discussed. If a user subsequently decides to modify one or more of these multiple operations, the user must re-write the code for the "single" pixel shader to alter the corresponding subroutine for each modified operation. The entire shader program (with the altered subroutine(s)) must be downloaded to a graphics card and executed to implement the modified operation(s). If the amount of time required for either constructing or downloading a program is proportional to the program's length, making a tiny change to one aspect of the rasterization process induces a penalty of the combined length of all the operations.

Therefore, a need exists to develop a technology that addresses these concerns and facilitates the ability to generate graphics in a timely and cost effective manner.

SUMMARY OF THE INVENTION

A method, system and computer program product are provided for utilizing a plurality of vertex processors (whether implemented in hardware and/or software) and/or a plurality of fragment processors (whether implemented in hardware and/or software), each executing a user-defined vertex or fragment program on a graphics processing unit (GPU) to generate a graphics image.

Unless otherwise specified, the term "processor" is used herein to indicate either a vertex processor or a fragment processor without loss of generality.

One or more "programmable" vertex processors can be implemented on the GPU to perform computation for a vertex. Each vertex processor is capable of executing a separate vertex program to generate transformed vertices suitable for processing in rasterization. A control unit, or combiner, manages the combination of the results from the vertex processors, and produces a final transformed vertex to be processed subsequently by the fragment part of the graphics pipeline.

One or more "programmable" fragment processors can be implemented on the GPU to perform computations for a pixel. Each fragment processor is capable of executing a separate fragment program to produce a specific result during the computations. A control unit, or combiner, manages the combination of the results from the fragment processors, and produces a final pixel value, such as color characteristics.

The processors can operate in a parallel configuration. As such, each processor operates independently and mutually exclusive of each other. The control unit would combine the results of the parallel operations to produce the final computed vertex or pixel value.

The processors can also operate in a serial configuration. As such, the collection of processors operate in a sequential order, and the results of one processor are passed as input to a subsequent processor. The last result is passed to the control unit, which resolves the final computed vertex or pixel value. In an embodiment, the output of each processor is fed into the control unit, which takes the output, possibly modifies it, and passes it into the next processor in line.

The processors can also operate in a multi-tiered configuration. As such, combinations of serial and parallel operations are performed by the collection of processors, and these operations are managed and resolved by the control unit. To facilitate the synchronization of output from each processor (especially with regards to the parallel operations), a synchronization barrier enables the control unit to perform data-dependency analysis to determine which processor needs to execute before other processors.

In an embodiment, the results of each processor are enhanced with a data field(s) that provides instructions to the control unit for resolving the final vertex or pixel value from the results. In another embodiment, a separate user-defined, combiner program is executed to provide combination instructions to the control unit for resolving the final vertex or pixel value from the results. In an embodiment, a combiner processor is programmable to receive instructions from user-created programs. In another embodiment, the operations of the control unit are fixed by the system architect.

In an embodiment, a transformation module includes one or more programmable vertex processors. The vertex processor(s) perform a sequence of operations, including, but not limited to, operations that transforms three-dimensional geometric coordinates ("vertices") into two-dimensional, window- (or screen-) oriented coordinates ("clip coordinates"). Additional vertex specific data may also be computed during the execution of the vertex shader on the vertex processor. The clip coordinates are subsequently passed to a rasterization module along with possibly additional two-dimensional pixel data that generates "fragments," which are ultimately processed into color pixel values. The rasterization module contains the one or more programmable fragment processors, which compute the results contributing to the final pixel value.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, generally, the leftmost digit(s) of a reference number identify the drawing in which the reference number first appears.

DETAILED DESCRIPTION OF THE INVENTION

Figure 1:
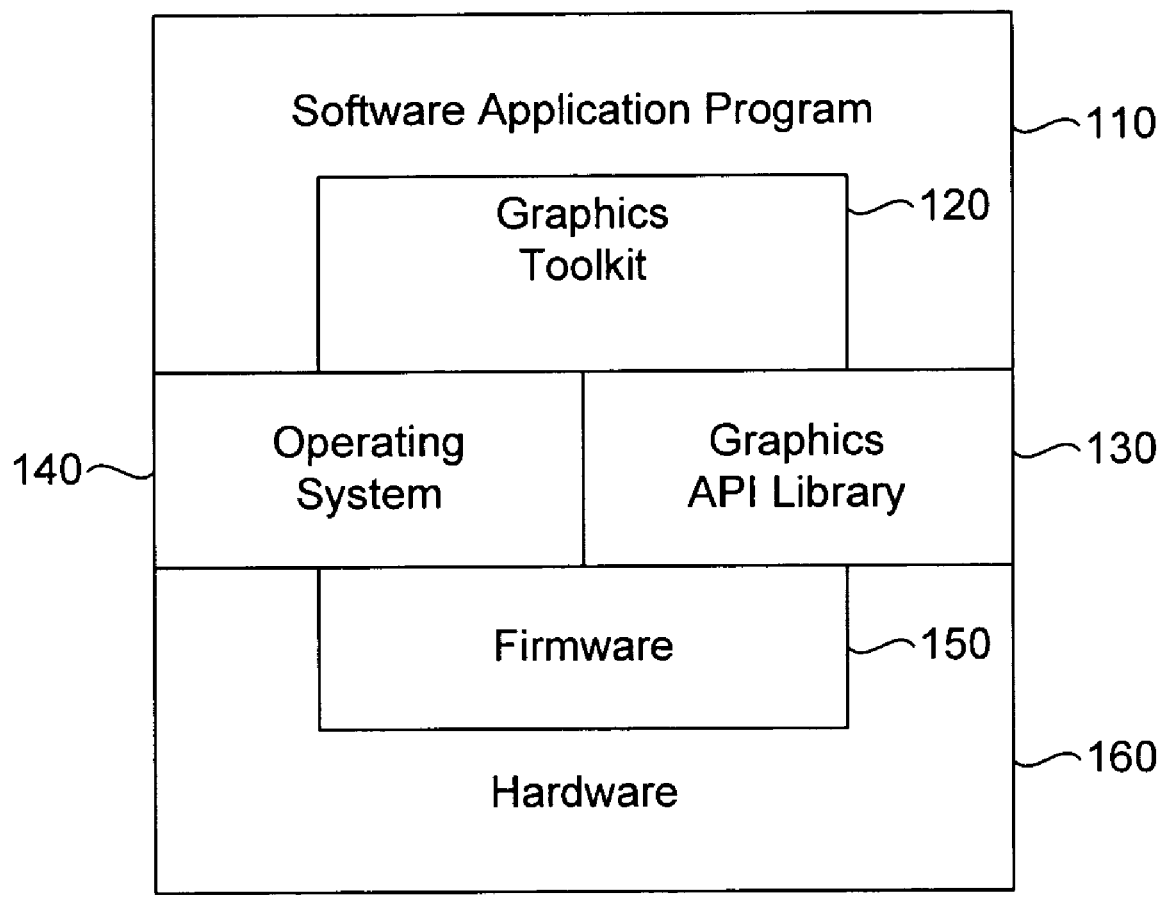
FIG. 1 illustrates a computer architecture for implementing the present invention.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art(s) to effect such feature, structure, or characteristic in connection with other embodiments whether or not explicitly described.

A method, system and computer program product are provided for utilizing a plurality of vertex processors (whether implemented in hardware and/or software) and/or a plurality of fragment processors (whether implemented in hardware and/or software), each executing a user-defined vertex or fragment program on a graphics processing unit (GPU) to generate a graphics image.

Unless otherwise specified, the term "processor" is used herein to indicate either a vertex processor or a fragment processor without loss of generality.

In an embodiment, a plurality of programmable vertex processors are utilized on the GPU to perform specific computations for a vertex. Each vertex processor is capable of executing a separate program, and can be executed in series and/or in parallel with respect to the other vertex processors. A control unit manages the combinations of the results from the distinct vertex processors into a final transformed vertex (with possible associated data) for subsequent processing in the rasterization part of the graphics pipeline.

Similarly in an embodiment, a plurality of programmable fragment processors are utilized on the GPU to perform specific computations for a pixel. Each fragment processor is capable of executing a separate program, and can be executed in series and/or in parallel with respect to other fragment processors. A control unit manages the combination of the results from the distinct fragment processors into a final value for the pixel. Specific embodiments of the present invention are discussed in greater detail below.

I. Terminology

The following terms are defined so that they may be used to describe embodiments of the present invention. As used herein:

"Vertex" means a data structure that is used to represent a point in three-dimensional space, possibly with additional data (for example, color, surface properties, etc.).

"Pixel" means a data structure that is used to represent a picture element. Any type of pixel format can be used.

"Texture" refers to image data or other types of data that can be mapped to an object to provide additional surface detail or other effects. In computer graphics applications, texture is often a data structure including, but not limited to, an array of texels. A texel can include, but is not limited to, a color value or an intensity value. These texel values are used in rendering to determine a value for a pixel. As used herein, the term "texture" includes, for example, texture maps, bump maps, and gloss maps.

"Texture sample" refers to a sample selected from a texture map or texture. The sample can represent one texel value or can be formed from two or more texel values blended together. Different weighting factors can be used for each texel blended together to form a sample. The terms "texel," "sample," and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some embodiments obtain multiple texture samples from multiple textures.

II. Example Architecture of the Invention

FIG. 1 illustrates a block diagram of an example computer architecture 100 in which the various features of the present invention can be implemented. This example architecture 100 is illustrative and not intended to limit the present invention. It is an advantage of the invention that it may be implemented in many different ways, in many environments, and on many different computers or computer systems.

Architecture 100 includes six overlapping layers 110-160. Layer 110 represents a high level software application program. Layer 120 represents a three-dimensional (3D) graphics software tool kit, such as the OPENGL PERFORMER™ toolkit available from Silicon Graphics, Inc. (Mountain View, Calif.). Layer 130 represents a graphics application programming interface (API), which can include but is not limited to the OPENGL® API available from Silicon Graphics, Inc. (Mountain View, Calif.), the DIRECTX® API available from Microsoft Corporation (Redmond, Wash.), or the like. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera.

In other embodiments of the present invention, less than all of the layers 110-160 of architecture 100 can be implemented. As will be apparent to a person skilled in the relevant art(s) after reading the description of the invention herein, various features of the present invention can be implemented in any one of the layers 110-160 of architecture 100, or in any combination of layers 110-160 of architecture 100.

III. Example System Embodiment of the Present Invention

Figure 2:
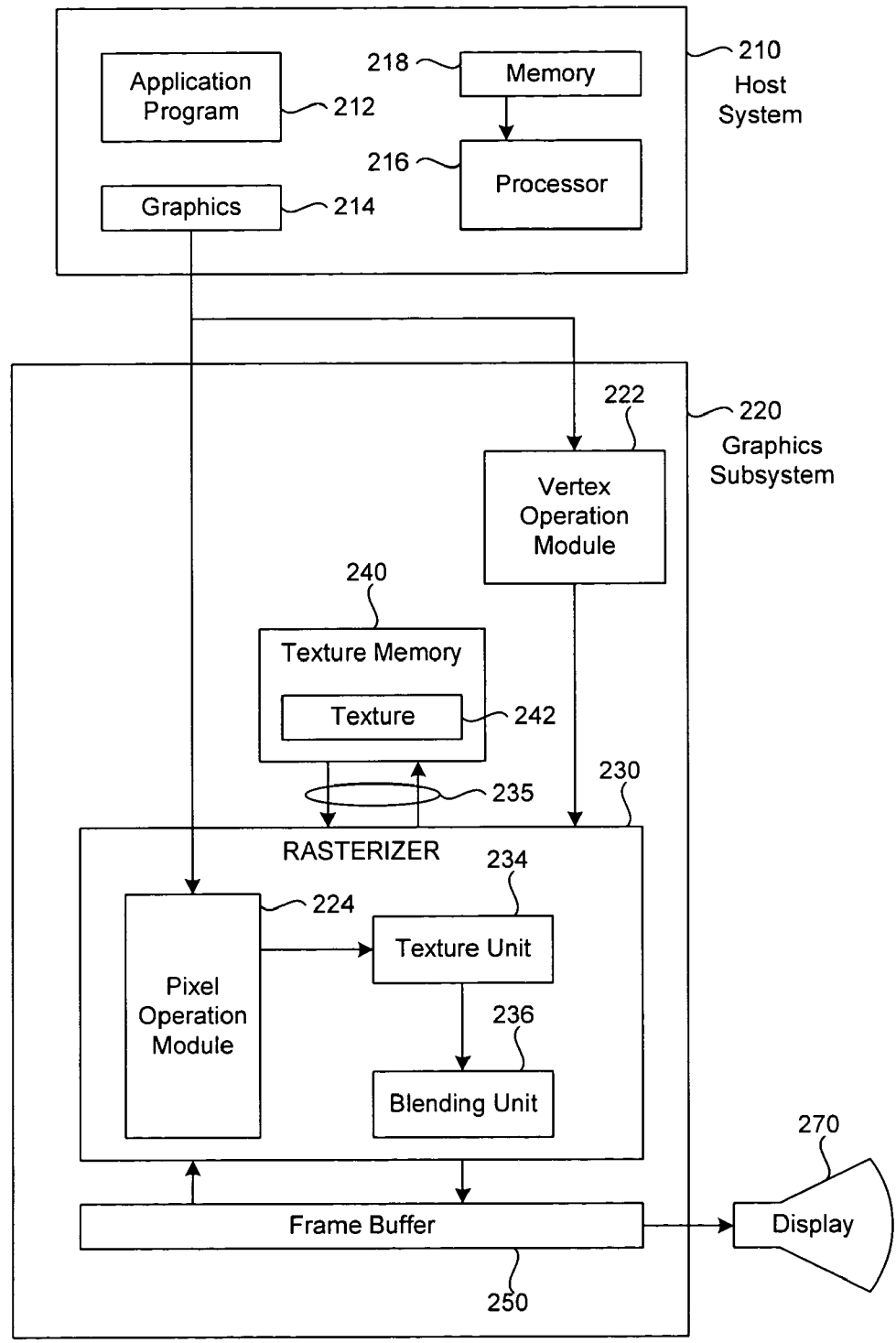
FIG. 2 illustrates a graphics system according to an embodiment of the present invention.

FIG. 2 illustrates an example graphics system 200 according to an embodiment of the present invention. Graphics system 200 comprises a host system 210, a graphics subsystem 220, and a display 270. Each of these features of graphics system 200 is further described below.

Host system 210 comprises an application program 212, a hardware interface or graphics API 214, a processor 216, and a memory 218. Application program 212 can be any program requiring the rendering of a computer image. The computer code of application program 212 is executed by processor 216. Application program 212 assesses the features of graphics subsystem 220 and display 270 through hardware interface or graphics API 214. Memory 218 stores information used by application program 212.

Graphics subsystem 220 comprises a vertex operation module 222, a rasterizer 230, a texture memory 240, and a frame buffer 250. Texture memory 240 can store one or more textures or images, such as texture 242. Texture memory 240 is connected to a texture unit 234 by a bus 235. Rasterizer 230 comprises a pixel operation module 224, a texture unit 234 and a blending unit 236. Texture unit 234 and blending unit 236 can be implemented separately or together as part of a graphics processor.

In embodiments of the present invention, texture unit 234 can obtain multiple point samples or multiple filtered texture samples from textures and/or images stored in texture memory 240. Blending unit 236 blends texels and/or pixel values according to weighting values to produce a single texel or pixel. The output of texture unit 234 and/or blending unit 236 is stored in frame buffer 250. Display 270 can be used to display images stored in frame buffer 250.

The embodiment of the invention shown in FIG. 2 has a multipass graphics pipeline. It is capable of operating on each pixel of an image (object) during each pass that the image makes through the graphics pipeline. For each pixel of the image, during each pass that the image makes through the graphics pipeline, texture unit 234 can obtain at least one texture sample from the textures and/or data stored in texture memory 240. Although the embodiment of the invention shown in FIG. 2 has a multipass graphics pipeline, it is noted here that other embodiments of the invention do not have a multipass graphics pipeline. Moreover, method embodiments of the invention can be implemented using systems that do not have a multipass graphics pipeline.

IV. Example Method Embodiments of Fragment Shading

According to embodiments of the present invention, a plurality of fragment processors are implemented within the graphics processing unit (GPU), such as graphics subsystem 220, to compute a pixel value, such as color characteristics. Each fragment processor is capable of executing a separate program.

Figure 3:
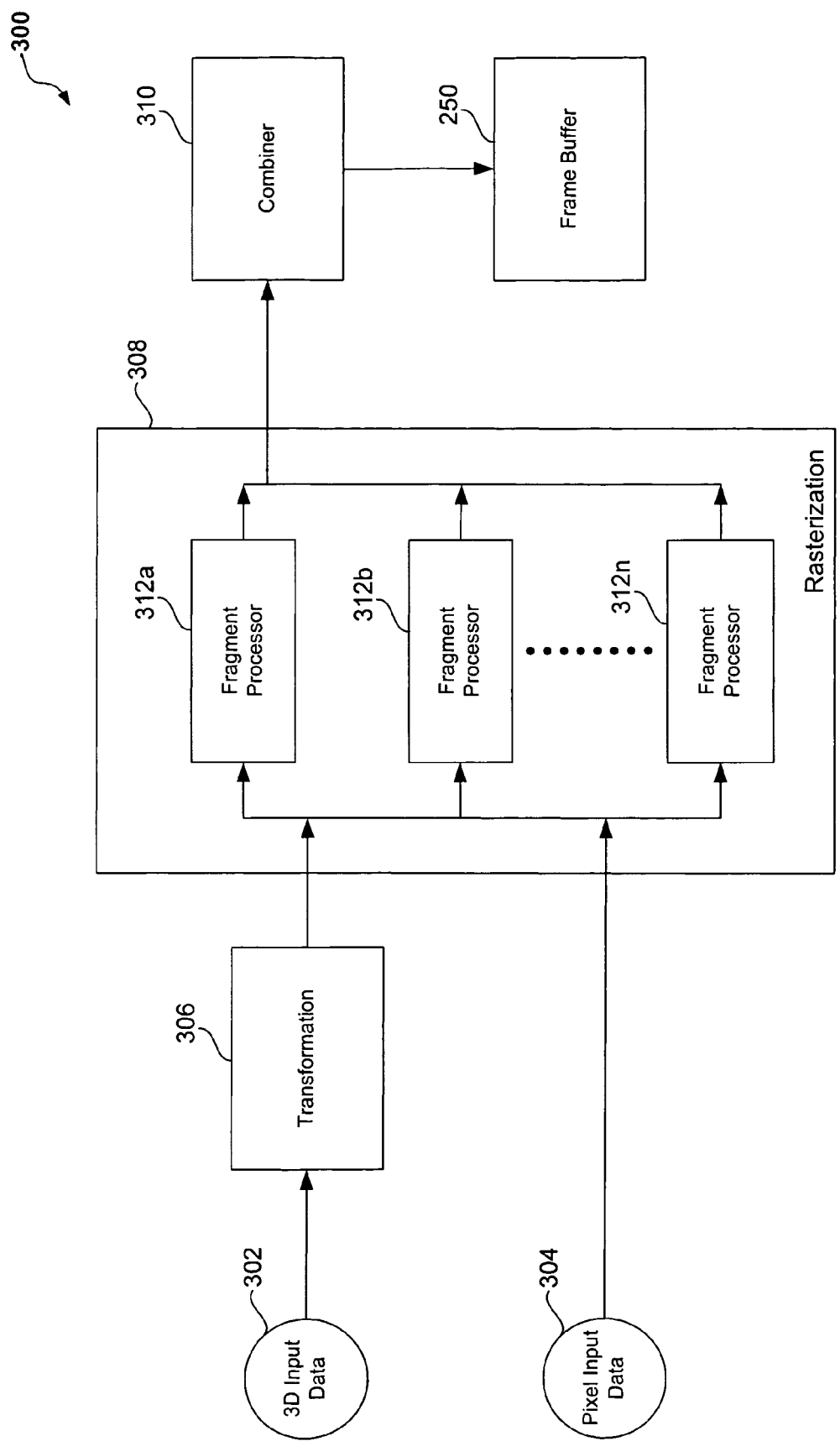
FIG. 3 illustrates a multi-shading graphics system having a plurality of parallel fragment processors according to an embodiment of the present invention.

Another embodiment of a GPU that is useful for implementing an embodiment of the present invention is illustrated in FIG. 3 as a multi-shading graphics subsystem 300. Multi-shading graphics subsystem 300 is characterized as a "programmable graphics pipeline" that processes three-dimensional geometric data 302 and two-dimensional pixel data 304 to display a single pixel in a frame buffer 250.

The three-dimensional geometric data 302 for the pixel is passed to a transformation module 306 (e.g., vertex operation module 222). Transformation module 306 executes one or more vertex shader programs. The vertex shader program(s) perform a sequence of mathematical operations that transform the three-dimensional geometric data 302 into clip coordinates.

The two-dimensional pixel data 304 for the pixel is passed to a rasterization module 308 (e.g., rasterizer 230). Rasterization module 308 applies the two-dimensional pixel data 304 and the clip coordinates from transformation module 306 to generate fragments. Rasterization module 308 also shades the fragments in a process that enables the computation of a final value (e.g., color) for the pixel. The rasterization computations can also include a depth value for determining whether the pixel is visible or occluded by other objects in a scene.

Rasterization module 308 includes a plurality of fragment processors 312a-312n that execute a plurality of pixel shader programs to conduct, for example, various color computations to generate the pixel's final color. The color computations include a base color application; a color application from a texture lookup table (e.g., texture memory 240); a blending of the base color with a color present at the pixel's location in frame buffer 250; various tests to determine whether a fragment should be written into frame buffer 250; or the like. If a fragment passes all enabled tests, its color is transferred into frame buffer 250 at the pre-computed location.

To compute the pixel's final value, the results of fragment processors 312a-312n are passed to a combiner 310. Combiner 310 is a control unit that is capable of arithmetic and/or logic processing. Thus, combiner 310 can mathematically combine the results from fragment processors 312a-312n, and/or select a certain result(s) from fragment processors 312a-312n, thereby discarding the non-selected result(s). The final value is passed to frame buffer 250, as discussed.

As discussed, multi-shading graphics subsystem 300 is a programmable graphics pipeline. As such, one or more of the vertex shader programs of transformation module 306 and/or one or more of the pixel shader programs of rasterization module 308 are user-created programs that instruct graphics subsystem 300 to performs specified operations on the data (e.g., three-dimensional geometric data 302, and two-dimensional pixel data 304). Since the shader programs of transformation module 306 and rasterization module 308 are individually programmable, a graphics programmer or user can control various aspects of the geometric processing, as discussed in greater detail below.

With respect to the plurality of fragment processors 312a-312n, each fragment processors 312a-312n is capable of executing a separate program. For instance, FIG. 3 depicts "n" fragment processors 312a-312n for executing "n" separate programs. As would be apparent to one skilled in the relevant art(s), the quantity of fragment processors 312a-312n depicted in FIG. 3 are shown for illustrative purposes only. The actual quantity can be any value as determined by the system architect.

FIG. 3 also depicts fragment processors 312a-312n in a parallel configuration. For example, a first fragment processors 312a can be instructed to compute a base color (e.g., blue) for a pixel through a user-defined fragment program. A second fragment processor 312b can likewise be instructed to sample a texture map (e.g., texture memory 240) to lookup a color to texture the pixel. A third fragment processor 312n can be instructed to execute a lighting computation to simulate lighting for the pixel. Finally, combiner 310 would add the results to produce the final pixel value.

An example of an assembly language that could be used write the first fragment program for fragment processor 312a is provided below:

```
#!ARBfp1.0
INPUT    iColor = fragment.color;
OUTPUT   oColor = result.color;
MOV      iColor, oColor;
END
```

The assembly language used to write the above example is part of a published specification from the OPENGL® Architecture Review Board (ARB), the ARB_fragment_program extension. Other assembly languages could be used to implement the present invention. As can be seen in the above code, the first fragment program for fragment processor 312a takes the input fragment color (i.e., fragment.color), and transfers it to the resulting pixel color (i.e., result.color).

An example of an assembly language that can be used write the second fragment program for fragment processor 312b is provided below:

```
#!ARBfp1.0
INPUT    iCoords = fragment.texcoord[0];
OUTPUT   oColor = result.color;
// sample texture 0 with input texture coordinates
TEX2D    oColor, iCoords, tex[0];
END
```

As can be seen in the above code, the second fragment program executed on fragment processor 312b retrieves the colors from a texture map to color the pixel.

An example of the assembly language that can be used to write the third fragment program for fragment processor 312c is provided below:

```
#!ARBfp1.0
INPUT    iCoords = fragment.texcoord[1];
ATTRIB   diffuse = state.material.diffuse;
ATTRIB   ambient = state.material.ambient;
TEMP     normal;
TEMP     eyeZ = { 0.0, 0.0, 1.0, 0.0 };
OUTPUT   oColor = result.color;
MOV      oColor, ambient;
TEX2D    normal, iCoords, tex[1];
DOT3     normal, normal, eyeZ;
MAD      oColor, normal, diffuse; // multiply-add
END
```

As can be seen in the above code, the third fragment program executed on fragment processor 312c computes the color of the pixel using a common (simplified) lighting model.

To combine the results together, combiner 310 is instructed to put the outputs from the fragment processors 312a-312c together. Depending upon the implementation of the interface for combiner 310, different approaches can be utilized to program combiner 310. In an embodiment, combiner 310 is programmed in a language similar to the fragment programs for fragment processors 312a-312c, as discussed above. An example of such a program for combiner 310 is provided below:

```
#!ARBfc1.0 // "whereas "fc" refers to fragment combiner"
INPUT    iColor0 = combiner.input[0];
INPUT    iColor1 = combiner.input[1];
INPUT    iColor2 = combiner.input[2];
TEMP     tmp;
OUTPUT   oColor = result.color;
// set output = input[0] + 0.5*input[1] + input[2]
MOV      oColor, iColor0;
MUL      tmp, 0.5, iColor1;
ADD      oColor, oColor, tmp;
ADD      oColor, oColor, iColor2;
END
```

The above approach would most likely use a small subset of the commands of the complete fragment processing language, but would be more flexible than having to use the full processing language. In another embodiment, a fixed set of subroutines is used to program combiner 310 to combine the results of fragment processors 312a-312c. A similar set of procedures exists in the OPENGL® API available from Silicon Graphics, Inc. (Mountain View, Calif.) that currently programs texture combiners (which were effectively replaced by a fragment processor). An example of the set of subroutines used to program combiner 310 is provided below:

```
    glEnable( GL_FRAGMENT_COMBINER0 ); // turn on input spigot
    glEnable( GL_FRAGMENT_COMBINER1 );
    glEnable( GL_FRAGMENT_COMBINER2 );
    glCombinerOp( GL_FRAGMENT_COMBINER1, GL_MULTIPLY, 0.5 );
    glCombinerOp( GL_FRAGMENT_COMBINER0, GL_ADD, GL_PREVIOUS_RESULT );
    glCombinerOp( GL_FRAGMENT_COMBINER2, GL_ADD, GL_PREVIOUS_RESULT );
```

The above approach would include appropriate mappings of inputs to results, and mathematical operations on those inputs. If a graphics board (e.g., graphics subsystem 300) has multiple fragment processors 312a-312c, and the language to program these processors is a superset of the operations that combiner 310 uses, then one of the fragment processors 312a-312c could be re-tasked (assuming suitable circuitry to handle mapping inputs to outputs) to be combiner 310, and programmed suitably.

In an embodiment, user-created programs are executed to create or modify fragment processors 312a-312n. In another embodiment, a user may be blocked from modifying one or more of fragment processors 312a-312n. This configuration is useful in a case where a software library allows a user to program selected fragment processor(s) 312a-312n, but make other fragment processor(s) 312a-312n available to graphics subsystem 300 for its own use.

Figure 4:
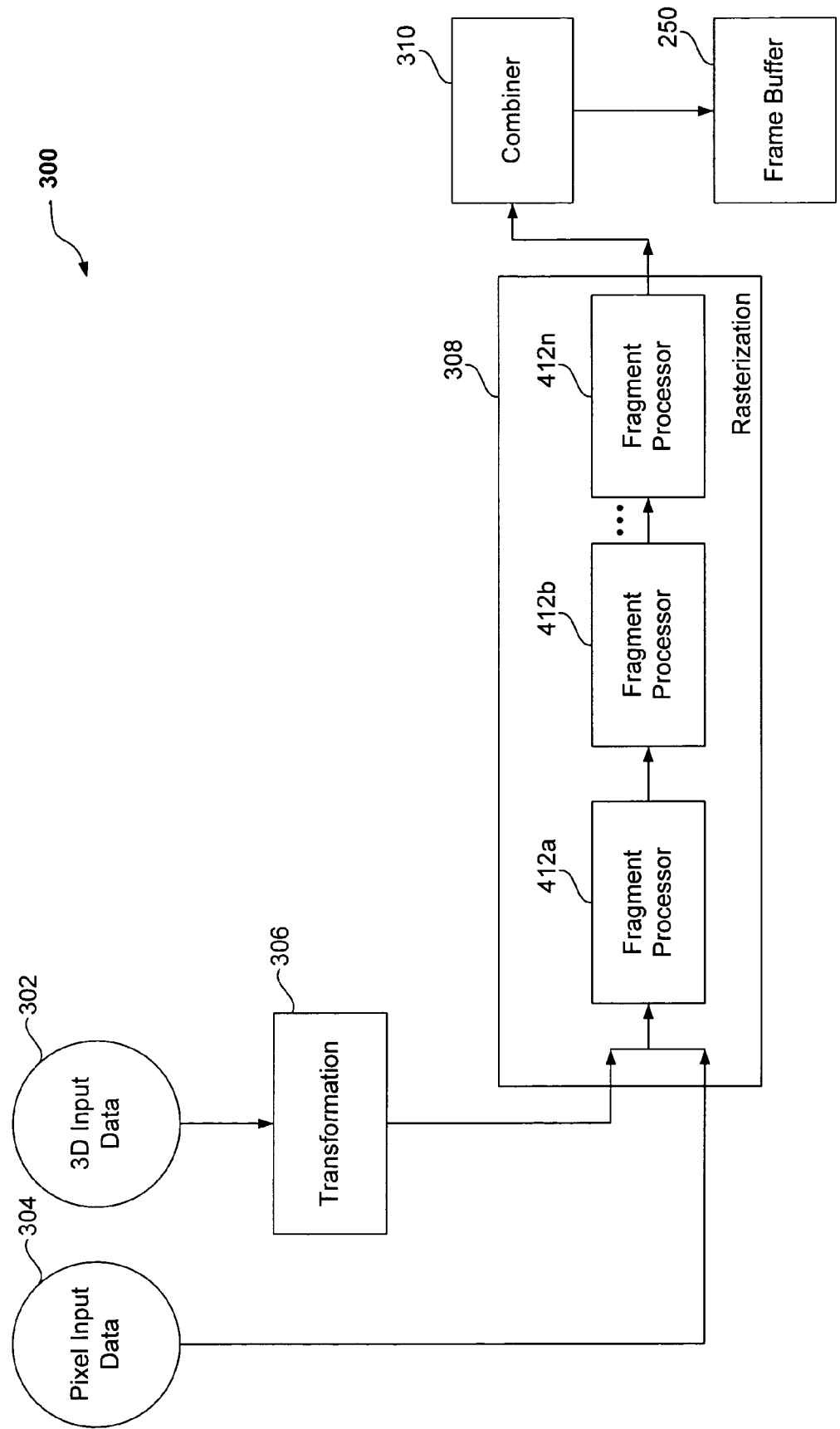
FIG. 4 illustrates a multi-shading graphics system having a plurality of serial fragment processors according to an embodiment of the present invention.

FIG. 4 illustrates another embodiment of multi-shading graphics subsystem 300, which serializes the processing of a fragment through rasterization module 308. Fragment processors 412a-412n are positioned in a sequential order, such that the results of one fragment processor 412a-412n is passed as input into a subsequent fragment processor 412a-

412n until all enabled processing stages have completed. The last result (from fragment processor 412n) is passed to combiner 310, which resolves the final pixel value. Combiner 310, therefore, not only handles colors, but the entire set of fragment data, so that the output of one fragment processor 312a-312n can be fed as input to another, when in a serial configuration.

Although "n" serialized fragment processors 412a-412n are provided for illustrative purposes, the actual quantity of fragment processors 412a-412n that can be provided in series can be determined by the system architect. Additionally, user-created programs can be executed to create or modify all or a subset of the serialized fragment processors 412a-412n, and/or selected fragment processors 412a-412n can be reserved for utilization by graphics subsystem 300.

Figure 5:
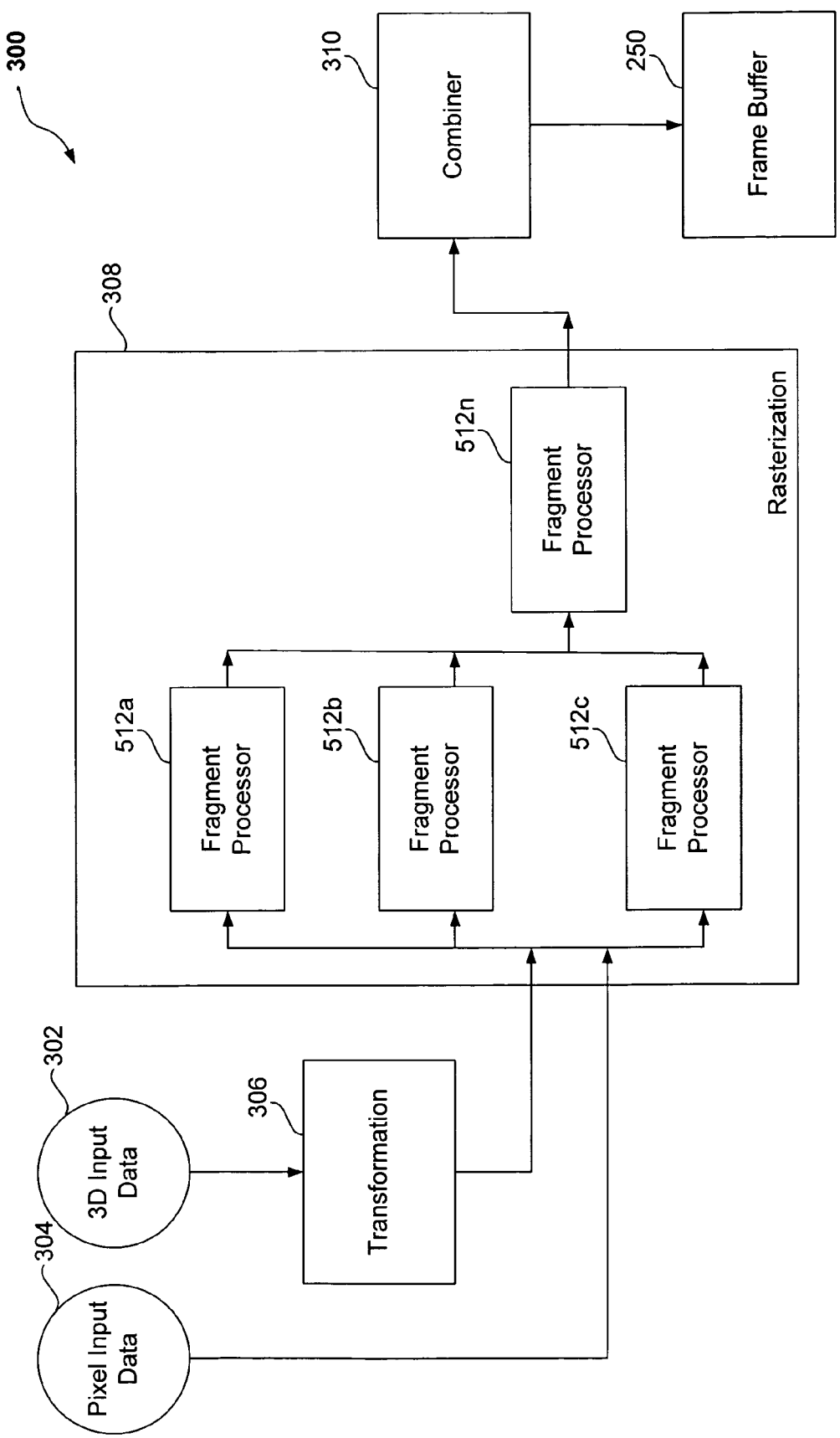
FIG. 5 illustrates a multi-shading graphics system having a plurality of parallel and serial fragment processors according to an embodiment of the present invention.

FIG. 5 illustrates another embodiment of multi-shading graphics subsystem 300, which combines serial and parallel fragment processing. Fragment processors 512a-512c produces a result in parallel with respect to each other. The parallel results are passed as input to fragment processor 512n, which performs a computation and passes its result to combiner 310, which resolves the final pixel value.

User-created programs can be executed to create or modify all or a subset of the fragment processors 512a-512n, and/or selected fragment processors 512a-512n can be reserved for utilization by graphics subsystem 300. Additionally, the quantity or ordering of the parallel and serial fragment processors 512a-512n can be altered, as determined by the system architect. Given a set of fragment processors 512a-512n, some subset of those fragment processors 512a-512n could execute in series with each other, while other fragment processors 512a-512n execute in parallel and have their outputs fed into combiner 310, which combines those values together and passes its output into some other subset of fragment processors 512a-512n, and so on. Therefore, it is important that the operations of each fragment processors 512a-512n are synchronized to improve system correctness, performance, and efficiency.

In an embodiment having serial fragment processors (such as, fragment processors 412a-412n), the output of every fragment processors is fed into combiner 310, which takes the output, possibly modifies it, and passes it into the next fragment processor in line. In this embodiment, the synchronization of output from the fragment processor (e.g., fragment processor 412a-412n) is implicit since combiner 310 cannot continue until an upstream fragment processor has finished its work.

In an embodiment having parallel fragment processors (such as, fragment processors 312a-312n), the fragment processors execute in parallel, and combiner 310 receives all of their output. When all fragment processing is complete, combiner 310 combines the values together and outputs the result. In this embodiment, the output from the fragment processors should be synchronized to enhance the performance of combiner 310.

In an embodiment having multi-tiered fragment processors (such as, fragment processors 512a-512n), some fragment processors execute and pass their output into combiner 310. Combiner 310 passes the results into the next fragment processors, which proceed to pass their results back into combiner 310, and so on, until all fragment processors have completed their programs in the designated order. In this embodiment, the synchronization of output from the fragment processors (e.g., fragment processors 512a-512n) are influenced by combiner 310, which operates as a "traffic cop," designating in what order and by whom operations proceed. With respect to the serial executions, combiner 310 merely waits until a previous stage is completed, and then either computes the final result, or passes data onto the next stage. For the parallel executions, combiner 310 needs to wait until all of the outputs from all currently parallel executing fragment processors (e.g., fragment processors 512a-512c) have completed before proceeding. Combiner 310, therefore, includes a synchronization barrier that enables compiler 310 to perform data-dependency analysis to determine which fragment processors (e.g., fragment processors 512a-512n) need to execute before other fragment processors can proceed.

The present invention also includes various techniques for instructing the operations of combiner 310. In an embodiment, the results of each fragment processor (e.g., fragment processors 312a-312n) are enhanced with a data field that provides instructions to combiner 310 for resolving the final pixel value from the results. In another embodiment, a separate combiner program is executed to provide combination instructions to combiner 310 for resolving the final pixel value from the results. In an embodiment, the data field or combiner program is programmable to receive instructions from user-created programs. In another embodiment, the operations of combiner 310 are fixed by the system architect.

V. Example Method Embodiments of Vertex Shading

As discussed above in an embodiment of the present invention, a plurality of vertex processors are executed by a graphics processing unit (GPU), such as graphics subsystem 220, to transform three-dimensional geometric data (such as data 302) into alternative coordinates (such as, three-dimensional eye coordinates, two-dimensional normalized device coordinates, two-dimensional clip coordinates, and the like). Each vertex processors is capable of executing a separate vertex program to produce a specific result during the transformation.

Figure 6:
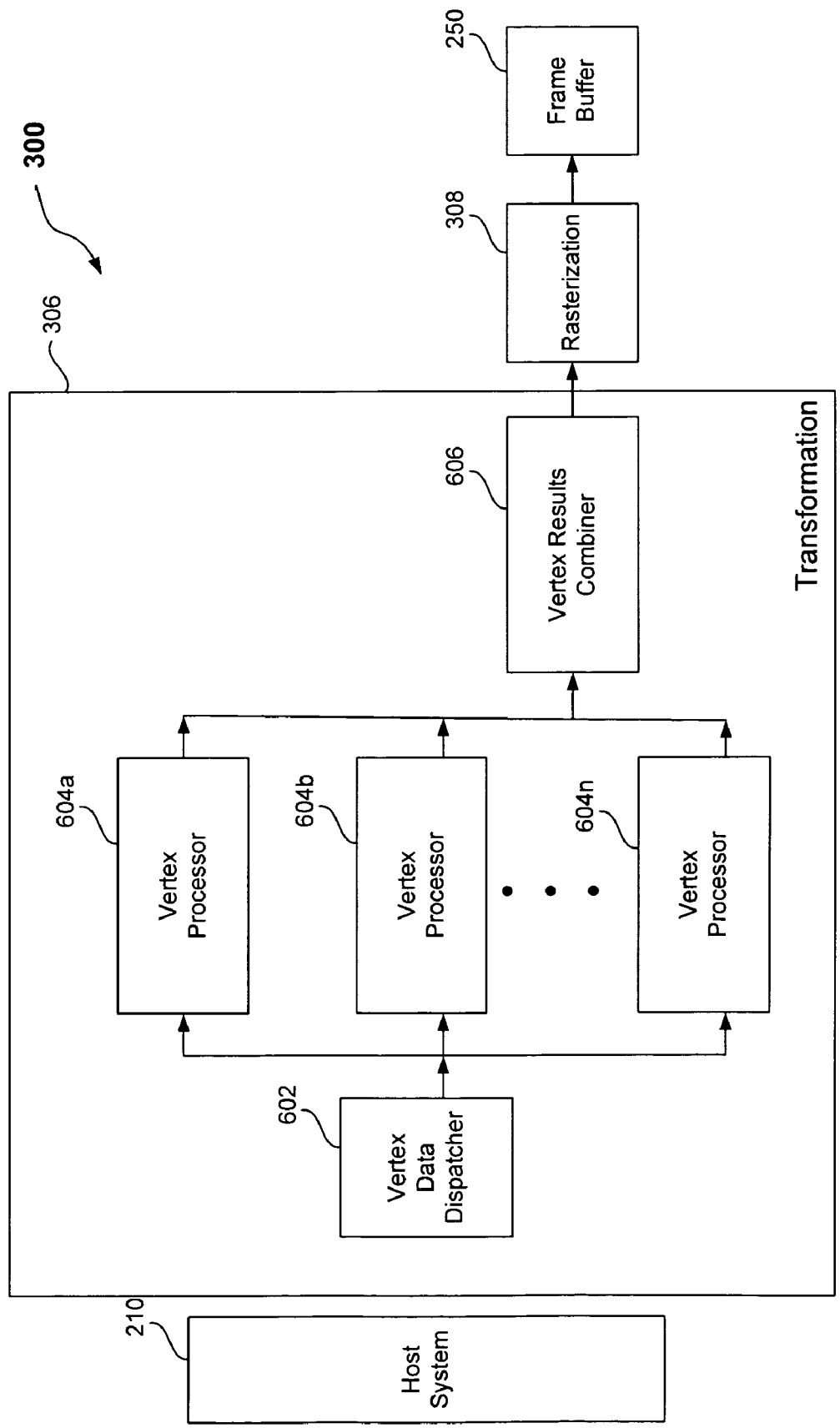
FIG. 6 illustrates a multi-shading graphics system having a plurality of parallel vertex processors according to an embodiment of the present invention.

FIG. 6 illustrates another embodiment of multi-shading graphics subsystem 300 that is useful for implementing aspects of the present invention. As shown, graphics subsystem 300 includes host system 210, transformation module 306, rasterization module 308, and frame buffer 250. As discussed above, host system 210 passes three-dimensional geometric data (such as data 302) to transformation module 306, which in turns processes and passes its results (e.g., clip coordinates) to rasterization module 308. Rasterization module 308 thereafter applies two-dimensional pixel data (such as, data 304) and the results from transformation module 306 to generate fragments, which are shaded to display a single pixel in frame buffer 250.

Transformation module 306 includes a vertex data dispatcher 602, a plurality of vertex processors 604a-604n, and a vertex results combiner 606. Transformation module 306 is configured to operate a plurality of vertex processors (shown as "vertex processors 604a-604n) in parallel mode. As such, vertex data dispatcher 602 accesses the three-dimensional data 302 from host system 210, and forwards the data 302 along the correct path to the appropriate vertex processor 604a-604n.

To compute the final clip coordinates, vertex results combiner 606 mathematically combines the results from vertex processors 604a-604n and/or selects a certain result(s) from vertex processors 604a-604n. Therefore, vertex results combiner 606 is a control unit that is capable of arithmetic and/or logic processing.

As discussed, one or more of the plurality of vertex processors 604a-604n are individually programmable, and each vertex processor 604a-604n are capable of executing a separate vertex program. The quantity of vertex processors 604a-604n can vary, as determined by the system architect.

Figure 7:
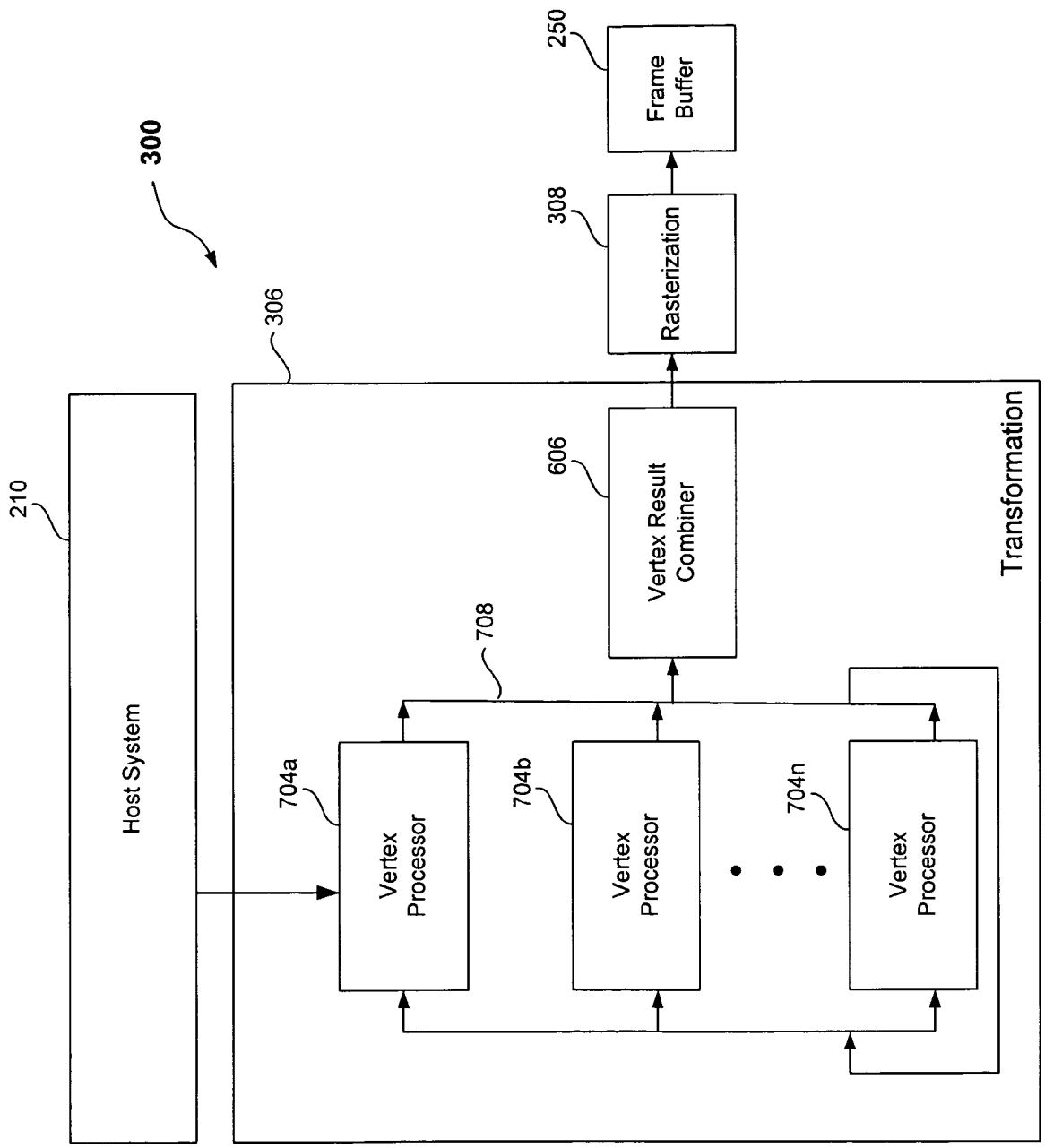
FIG. 7 illustrates a multi-shading graphics system having a plurality of serial vertex processors according to an embodiment of the present invention.

In another embodiment of the present invention, a plurality of vertex processors are provided in a serial configuration. FIG. 7 illustrates another embodiment of multi-shading graphics subsystem 300, which serializes the processing of geometric data (e.g., data 302) through transformation module 306. As shown, transformation module 306 includes a plurality of vertex processors 704a-704n, communications infrastructure 708, and vertex results combiner 606. Vertex processors 704a-704n serializes the processing through transformation module 306, such that the results of one vertex processor 704a-704n is passed as input into a subsequent vertex processor 704a-704n until all enabled processing stages have completed. The last result (from vertex processor 704n) is passed to vertex-results combiner 606, which computes the final clip coordinate.

Figure 8:
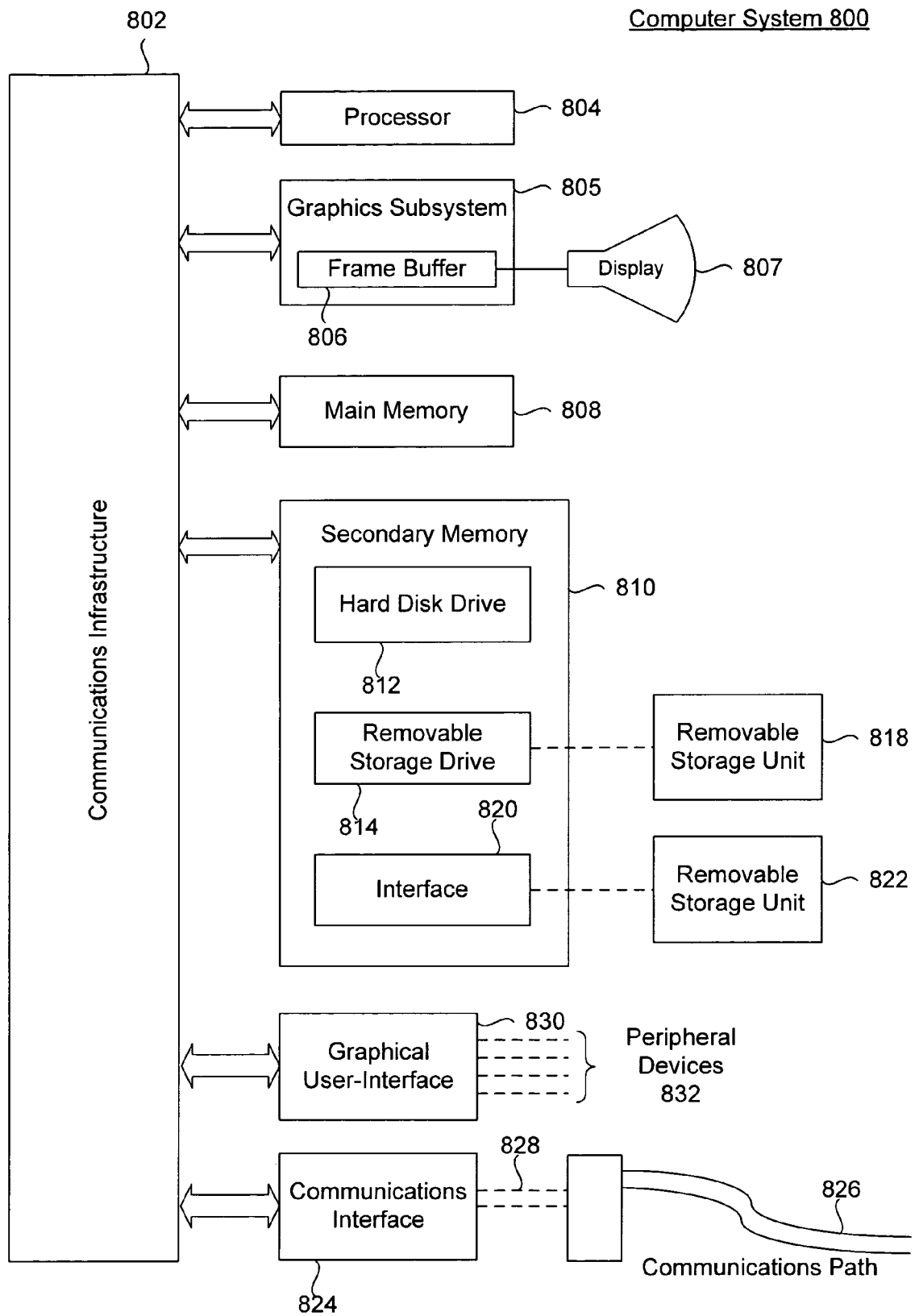
FIG. 8 illustrates an example computer system useful for implementing portions of the present invention.

Communications infrastructure 708 can be a communications bus or the like (such as communications infrastructure 802 described below with reference to FIG. 8). Communications infrastructure 708 provides bidirectional communications among vertex processors 704a-704n and vertex results combiner 606. The information exchanged during the bidirectional communications includes, but is not limited to, results from vertex processors 704a-704n, synchronization information, and intermediate output from vertex results combiner 606.

As discussed, one or more of the plurality of vertex processors 704a-704n are individually programmable, and each vertex processor 704a-704n are capable of executing a separate vertex program. Additionally, the quantity of vertex processors 704a-704n can vary, as determined by the system architect. Moreover, in other embodiments a plurality vertex processors can be provided to support a combination of parallel vertex shading (e.g., vertex processors 604a-604n) and serial vertex shading (e.g., vertex processors 704a-704n). In such a multi-tiered environment, one or more parallel vertex processors (e.g., 604a-604n) execute and pass their output to vertex results combiner 606, which proceeds to pass results to one or more serial vertex processors (e.g., 704a-704n). The serial vertex processors(s) (e.g., 704a-704n) would, in turn, pass results back to vertex results combiner 606, and so on, until all vertex processors have completed their programs in a designated order. As such, vertex combiner 606 synchronizes the operations similarly to combiner 310, as discussed above.

The present invention provides significant improvements over an existing graphics system that includes multiple vertex or fragment processors in a single instruction multiple data (SIMD) environment. For example, a single fragment processor must contain all color computations for the pixel that is being processed. Therefore, if one or more of these color computations must be applied to other pixels, the entire fragment program must be executed to re-compute the re-occurring color computations. However, the present invention does not require redundant or re-occurring computations for multiple pixels to be re-computed for each pixel. Such computations can be stored and re-utilized during the computations for other pixels. As a result, significant savings can be realized over the processing time when compared to the existing graphics system with a single fragment processor.

The present invention also better manages user modifications to fragment programming than an existing graphics system with a single fragment processor. For example, should a user program the fragment processor to perform N operations, these operations would be combined within the code for a single fragment program. The single fragment program would be downloaded to a graphics card, and executed. Should the user decide to modify one or more of the N operations, the user would need to re-write the single fragment program to alter the subroutine for each modified operation. The entire fragment program (with the altered subroutine(s)) must be downloaded and executed to implement the modified operation(s). If the amount of time required for either constructing or downloading a program is proportional to the program's length, making a tiny change to one aspect of the fragment's processing induces a penalty of the combined length of all the operations.

However, the user-programmable processors (e.g., fragment processors 412a-412n, vertex processors 704a-704n, etc.) of the present invention allow a user to configure a combiner (e.g., combiner 310, combiner 606, etc.) to run the processing in a sequential mode, as discussed above. If a user desires to change a small part of one or more operations performed by a respective processors (e.g., fragment processors 412a-412n, vertex processors 704a-704n, etc.), the only penalty incurred by the system (e.g., system 300) is that associated with constructing and reloading the modified processor(s) (e.g., fragment processors 412a-412n, vertex processors 704a-704n, etc.). The operation(s) performed by the unmodified program executing on its assigned processor (e.g., fragment processors 412a-412n, vertex processors 704a-704n, etc.) impose no significant adverse impacts on system efficiency.

The present invention improves the efficiency and efficacy of post-processing operation(s) that are outside of what the original application author or user has considered. For example, assume that the fragment processing operations of a graphics system cannot be modified. However, a user desires to modify one more images generated by a fragment program (e.g., color correction or balance, blurring or sharpening of the image, or other image processing operations). With an existing single fragment execution engine, the user would need to have the "single" fragment program generate the images, and save them to off-line storage (i.e., retrieve the image from the graphic board's frame buffer, and store it in the system's memory or disk drive). Afterwards, the user must reload the fragment processor with the post-processing operations and submit the previous image to the graphics subsystem for subsequent processing. The fragment processor would, thereafter, pass the images back to the graphics board, and generate the output.

However according to embodiments of the present invention, the user programs the combiner (e.g., combiner 310) to take the output of a first processor (e.g., fragment processor 412a), and pass it into a second processor (e.g., fragment processor 412b) that is programmed to generate a final result. This is beneficial on many fronts: first, retrieving images from a graphics board is a slow operation, and then the images need to be sent back down to the graphics board for the subsequent processing, which also takes time. The difference in bandwidths and speeds of doing all of the processing on the board in a single pass is orders of magnitude faster than the read-back approach executed by the above-described, existing, single fragment processor.

In an embodiment of the present invention, a user or user-program can intercept the graphics commands of a graphics application and perform post-processing on the associated operation(s). If a single fragment (or vertex) program executing on a fragment (or vertex) processor is being utilized, the bookkeeping relative to managing the single processor is more intensive in comparison with the bookkeeping relative to managing multiple processors (e.g., fragment processors 312a-312n, vertex processors 704a-704n, etc.). Utilizing a combiner (e.g., combiner 310, combiner 606, etc.) and a plurality of programs executing on processors (e.g., fragment processors 312*a*-312*n*, vertex processors 704*a*-704*n*, etc.), a user can execute the interception commands to, thereby, turn-on and turn-off certain processing features without having to do much with the graphic applications original command stream. Using a single processor, the user or components of the graphics system must preserve the graphics application's graphics state, which usually either requires reading it from a graphics board (which slows down operations), or keeping track of every change executed by the interception commands so that the user can replace them if the user makes subsequent modifications (which is tedious and prone to errors).

VI. Example Computer System for Implementing Computer Program Product Embodiments of the Invention FIGS. 1-7 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

The present invention can be implemented in one or more computer systems capable of carrying out the functionality described herein. FIG. 8 illustrates an example of a computer system 800 that can be used to implement computer program product embodiments of the present invention. This example computer system is illustrative and not intended to limit the present invention. Computer system 800 represents any single or multi-processor computer. Single-threaded and multi-threaded computers can be used. Unified or distributed memory systems can be used.

Computer system 800 includes one or more processors, such as processor 804, and one or more graphics subsystems, such as graphics subsystem 805. One or more processors 804 and one or more graphics subsystems 805 (e.g., graphics subsystem 220 or graphics subsystem 300) can execute software and implement all or part of the features of the present invention described herein. Graphics subsystem 805 forwards graphics, text, and other data from the communications infrastructure 802 or from a frame buffer 806 (e.g., frame buffer 250) for display on the display 807 (e.g., display 270). Graphics subsystem 805 can be implemented, for example, on a single chip as a part of processor 804, or it can be implemented on one or more separate chips located on a graphic board. Each processor 804 is connected to a communications infrastructure 802 (e.g., a communications bus, cross-bar, or network). After reading this description, it will become apparent to a person skilled in the relevant art(s) how to implement the invention using other computer systems and/or computer architectures.

Computer system 800 also includes a main memory 808, preferably random access memory (RAM), and can also include secondary memory 810. Secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software (e.g., programs or other instructions) and/or data.

In alternative embodiments, secondary memory 810 may include other similar means for allowing computer software and/or data to be loaded into computer system 800. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

In an embodiment, computer system 800 includes a frame buffer 806 and a display 807. Frame buffer 806 is in electrical communications with graphics subsystem 805. Images stored in frame buffer 806 can be viewed using display 807. Many of the features of the invention described herein are performed within the graphics subsystem 805.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, a PCMCIA slot and card, etc. Software and data transferred via communications interface 824 are in the form of signals 828 which can be electronic, electromagnetic, optical or other signals capable of being received by communications interface 824, via communications path 826. Note that communications interface 824 provides a means by which computer system 800 can interface to a network such as the Internet. Communications path 826 carries signals 828 and can be implemented using wire or cable, fiber optics, a phone line, a cellular phone link, an RF link, free-space optics, and/or other communications channels.

Computer system 800 can include one or more peripheral devices 832, which are coupled to communications infrastructure 802 by graphical user-interface 830. Example peripheral devices 832, which can form a part of computer system 800, include, for example, a keyboard, a pointing device (e.g., a mouse), a joy stick, and a game pad. Other peripheral devices 832, which can form a part of computer system 800 will be known to a person skilled in the relevant art(s) given the description herein.

In this document, the term "computer program medium" and "computer usable medium" are used to generally refer to media such as removable storage unit 818, removable storage unit 822, a hard disk installed in hard disk drive 812, or a carrier wave or other signal 828 carrying software over a communications path 826 to communications interface 824. These computer program products are means for providing software to computer system 800.

Computer programs (also called computer control logic or computer readable program code) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812, interface 820, or communications interface 824. Alternatively, the computer program product may be downloaded to computer system 800 over communications path 826. The control logic (software), when executed by the one or more processors 804, causes the processor(s) 804 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art(s).

In yet another embodiment, the invention is implemented using a combination of both hardware and software.

The foregoing description of the specific embodiments will so fully reveal the general nature of the invention that others can, by applying knowledge within the skill of the art (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the art.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A system for computing a vertex or pixel value, comprising:
    a plurality of processors of a same processor type arranged in parallel and configured to operate on the same vertex or pixel, each processor of the plurality of processors configured to execute a segment of executable code constituting a part of a single vertex or shader program, wherein the plurality of processors compute a respective plurality of transformed or rasterized results for the same vertex or pixel; and
    a combiner configured to combine the transformed or rasterized results from said plurality of processors to produce the vertex or pixel value.

2. The system of claim 1, wherein said plurality of processors includes a plurality of vertex processors.

3. The system of claim 1, wherein said plurality of processors includes a plurality of fragment processors.

4. The system of claim 1, further comprising at least one additional processor, wherein the at least one additional processor is configured to operate in series with respect to one of the plurality of processors.

5. The system of claim 1, wherein at least one of said plurality of processors is adapted to receive user input, wherein said user input is executed to modify said at least one of said plurality of processors.

6. The system of claim 1, wherein at least one of said plurality of processors is adapted to receive user input, wherein said user input is executed to modify an operation of said combiner.

7. The system of claim 1, further comprising:
    a user program that, when executed, provides instructions to said combiner to produce the vertex or pixel value.

8. The system of claim 1, wherein a result from at least one of said plurality of processors includes instructions for producing the vertex or pixel value.

9. The system of claim 1, further comprising:
    a programmable vertex processor, wherein a programmable vertex program includes instructions that, when executed, transforms data into subsequently generated fragments, wherein a fragment processor performs an operation on said fragment.

10. The system of claim 1, wherein said combiner is configured to selectively combine the transformed or rasterized results from said plurality of processors to produce the vertex or pixel value.

11. The system of claim 10, wherein said combiner is configured to selectively combine the transformed or rasterized results by calculating a weighted combination of transformed or rasterized results from said plurality of processors.

12. The system of claim 1, wherein said plurality of processors is configured to be synchronized according to a determination of a data dependency analysis.

13. The system of claim 1, wherein said plurality of processors is configured to be synchronized according to a determination of a relative order of execution of a first segment of code and a second segment of code.

14. The system of claim 1, wherein said combiner is configured to synchronize said plurality of processors according to a determination of at least one of a data dependency analysis or a relative order of execution of a first segment of code and a second segment of code.

15. A method for computing a vertex or pixel value, comprising the steps of:
    executing on a first processor a first segment of code constituting a first part of a single vertex or shader program to compute a first transformed or rasterized result for the vertex or pixel value;
    executing in parallel with the first segment of code on a second processor of a same processor type as the first processor and arranged in parallel with the second processor a second segment of code constituting a second part of the single vertex or shader program to compute a second transformed or rasterized result for the same vertex or pixel value; and
    combining at a control unit said first transformed or rasterized result and said second transformed or rasterized result to produce a combined vertex or pixel value.

16. The method of claim 15, further comprising:
    accessing user instructions to modify at least one of said first segment of code and said second segment of code.

17. The method of claim 15, further comprising:
    receiving user instructions to specify an operation of said combining step.

18. The method of claim 17, wherein said combining step comprises:
    executing said user instructions to combine said first transformed or rasterized result and said second transformed or rasterized result into a single transformed or rasterized result for the vertex or pixel value.

19. The method of claim 15, further comprising:
    transforming data into a fragment, whereby said first segment of code is executed to compute said first transformed or rasterized result from said fragment.

20. The method of claim 19, further comprising:
    receiving user instructions to modify an operation of said transforming step.

21. The method of claim 15, further comprising selectively combining the first transformed or rasterized result and the second transformed or rasterized result to produce the vertex or pixel value.

22. The method of claim 21, further comprising selectively combining the first transformed or rasterized result and the second transformed or rasterized result by calculating a weighted combination of the first transformed or rasterized result and the second transformed or rasterized result.

23. The method of claim 15, further comprising:
    executing a third segment of code and a fourth segment of code with at least one of the first processor and the second processor; and
    synchronizing an order of operation of the first processor and the second processor according to a determination of a data dependency analysis.

24. The method of claim 15, further comprising synchronizing the order of operation of the first processor and the second processor according to a determination of a relative order of execution of the third segment of code and the fourth segment of code.

25. A computer program product comprising a non-transitory computer useable storage medium having computer readable program code functions embedded in said medium for causing a graphics processing unit to compute a vertex or pixel value, comprising:
    a first computer readable program code function that causes a first processor of the graphics processing unit to execute a first segment of code constituting a first part of a single vertex or shader program for generating a first transformed or rasterized result for the vertex or pixel value;
    a second computer readable program code function that causes a second processor of the graphics processing unit and which is of a same processor type as the first processor and arranged in parallel with the first processor to execute in parallel with the first segment of code a second segment of code constituting a second part of the single vertex or shader program for generating a second transformed or rasterized result for the same vertex or pixel value; and
    a third computer readable program code function that causes a control unit to combine said first transformed or rasterized result and said second transformed or rasterized result to produce a combined vertex or pixel value.

26. The computer program product according to claim 25, further comprising:
    a fourth computer readable program code function that causes the graphics processing unit to access user input to modify at least one of said first computer readable program code function, said second computer readable program code function, and said third computer readable program code function.

27. The computer program product according to claim 25, wherein said third computer readable program code function comprises:
    a fourth computer readable program code function that causes the graphics processing unit to combine said first transformed or rasterized result and said second transformed or rasterized result into a single transformed or rasterized result for the vertex or pixel value.

28. The computer program product of claim 25, further comprising a fourth computer readable program code function that causes the control unit to selectively combine said first transformed or rasterized result and said second transformed or rasterized result.

29. The computer program product of claim 28, further comprising a fifth computer readable program code function that causes the control unit to combine the first transformed or rasterized result and the second transformed or rasterized result by calculating a weighted combination of the first transformed or rasterized result and the second transformed or rasterized result.

30. The computer program product of claim 25, further comprising a fourth computer readable program code function that causes the graphics processing unit to:
    executing a third segment of code and a fourth segment of code with at least one of the first processor and the second processor; and
    synchronize an order of operation of the first processor and the second processor.

31. The computer program product of claim 30, further comprising a fifth computer readable program code function that causes the graphics processing unit to synchronize the order of operation based on at least one of a data dependency analysis or a relative order of execution of the third segment of code and the fourth segment of code.

32. A system for computing a plurality of vertex or pixel values, comprising:
    a first processor configured to determine that a plurality of vertexes or pixels require a redundant transformation or rasterization calculation, such that the transformation or rasterization calculation is the same for each of the plurality of vertexes or pixels;
    a second single processor configured to perform the redundant calculation; and
    means to assign a transformed or rasterized result of the redundant transformation or rasterization calculation from the second processor to the plurality of vertexes or pixels.

33. The system of claim 32, wherein said means to assign the result of the redundant transformation or rasterization calculation comprises at least one of:
    a memory configured to store the result of the redundant transformation or rasterization calculation;
    a third processor configured to distribute the result of the redundant transformation or rasterization calculation; or
    a fourth processor configured to combine the result of the redundant transformation or rasterization calculation with a data pertaining to a vertex or a pixel of the plurality of vertexes or pixels.

34. A system for computing a vertex or pixel value, comprising:
    a plurality of redundant graphics processors of a same processor type arranged in parallel and configured to provide distributed operations on a vertex or pixel, said redundant processors configured to compute a plurality of transformed or rasterized results for a same vertex or pixel; and
    a combiner configured to combine the transformed or rasterized results from said plurality of processors to produce the vertex or pixel value.

* * * * *